US012599464B2

(12) United States Patent (10) Patent No.: US 12,599,464 B2
Sivri (45) Date of Patent: Apr. 14, 2026

(54) PRODUCTION OF DENTAL FLOSS FROM WOOD FIBERS

(71) Applicant: BAHCESEHIR UNIVERSITESI, Istanbul (TR)

(72) Inventor: Caglar Sivri, Istanbul (TR)

(73) Assignee: BAHCESEHIR UNIVERSITESI, Istanbul (TR)

( * ) Notice: Subject to any disclaimer, the term of this patent is extended or adjusted under 35 U.S.C. 154(b) by 321 days.

(21) Appl. No.: 18/280,274

(22) PCT Filed: Oct. 12, 2021

(86) PCT No.: PCT/TR2021/051043
§ 371 (c)(1),
(2) Date: Sep. 5, 2023

(87) PCT Pub. No.: WO2022/139727
PCT Pub. Date: Jun. 30, 2022

(65) Prior Publication Data
US 2024/0307160 A1 Sep. 19, 2024

(51) Int. Cl.
| | |
|---|---|
| *D01D 1/02* | (2006.01) |
| *A61C 15/04* | (2006.01) |
| *D01D 5/06* | (2006.01) |
| *D01D 7/00* | (2006.01) |
| *D01D 10/06* | (2006.01) |
| *D01F 2/00* | (2006.01) |
| *D01F 2/02* | (2006.01) |
| *D01H 4/00* | (2006.01) |
| *D01H 7/52* | (2006.01) |

(52) U.S. Cl.
CPC .............. *A61C 15/041* (2013.01); *D01F 2/00* (2013.01)

(58) Field of Classification Search
CPC .. D01D 1/02; D01D 5/06; D01D 7/00; D01D 10/06; D01F 2/00; D01F 2/02; D01H 4/00; D01H 7/52
USPC .......... 264/178 F, 187, 211.12, 211.14, 233; 57/75, 400
See application file for complete search history.

(56) References Cited

U.S. PATENT DOCUMENTS

2021/0246581 A1* 8/2021 Flynn ........................ D01F 2/02

FOREIGN PATENT DOCUMENTS

| CN | 104305180 A | * | 1/2015 | .............. A23L 2/00 |
|---|---|---|---|---|
| CN | 110230111 A | | 9/2019 | |
| EP | 3385433 A1 | | 10/2018 | |
| EP | 3536831 A1 | | 9/2019 | |

OTHER PUBLICATIONS

Translation of CN 104305180 A (published on Jan. 28, 2015).*
Translation of CN 110230111 A (published on Sep. 13, 2019).*

* cited by examiner

*Primary Examiner* — Leo B Tentoni
(74) *Attorney, Agent, or Firm* — Bayramoglu Law Offices LLC

(57) ABSTRACT

Celluloses are taken from industrial trees by means of chemical pulp processing method which does not give damage to environment, and turned into fiber form, and fibers of industrial trees are turned into dental floss form. As said industrial tree; a kind of tree selected from beech tree, birch tree, poplar tree, elm and oak tree is used.

4 Claims, No Drawings

PRODUCTION OF DENTAL FLOSS FROM WOOD FIBERS

CROSS REFERENCE TO THE RELATED APPLICATIONS

This application is the national phase entry of International Application No. PCT/TR2021/051043, filed on Oct. 12, 2021, which is based upon and claims priority to Turkish Patent Application No. 2020/21062, filed on Dec. 21, 2020, the entire contents of which are incorporated herein by reference.

TECHNICAL FIELD

The present invention relates to production of dental floss from the fibers of trees like beech tree, birch tree, poplar tree, elm and oak tree and which is bio-compatible and which can decompose as waste in environment when its usage duration is finished.

The technical field of the present invention relates to production of personal care and hygiene products.

BACKGROUND

Tooth brushing process cleans only 60% of tooth surfaces. Therefore, a special care is further needed for cleaning bacteria plaques and food wastes which remain between the teeth. In order to clean these plaques and food wastes which are the primary reasons of tooth cavities and gum diseases, doctors recommend using dental floss regularly every day.

In the past, dental flosses were produced by bending silk fibers in the form of a long strip. Since the dental floss to be obtained by means of this method has a high cost, in the art, dental flosses are produced essentially by means of synthetic-based nylon filament or perfloroalkyl and polyfloroalkyl. Particularly besides nylon filament, perfloroalkyl material is accumulated in the body without decomposing in accordance with the Environment Protection Agency (EPA). The effects of subjection of human body regularly to said chemical materials on human health are being searched in the art. In the results obtained recently, it is known that said chemical materials lead to health problems like high cholesterol, kidney, testicular cancer and thyroid disease.

In the known state of the art, since the production stages and the beginning materials of dental flosses produced from nylon filament or plastic mono filaments have toxic characteristics, they give damage to environment. Moreover, when the usage duration of said disposable dental flosses is finished, they do not decompose in environment.

The materials which are to be used as dental floss must have characteristics like pH degree, not giving harm to gum and must be antibacterial. In the opposite case, they shall deteriorate mouth health.

As a result, in the related technical field, improvements are needed since the beginning materials used for dental floss production are toxic and not bio-compatible and do not have specific characteristics which are needed for mouth cleaning.

SUMMARY

The present invention relates to a non-toxic and bio-compatible dental floss, for eliminating the abovementioned disadvantages and for bringing new advantages to the related technical field.

An object of the present invention is to provide a dental floss having raw materials which are non-toxic.

Another object of the present invention is to provide a dental floss which is bio-compatible to mouth medium.

Another object of the present invention is to provide a dental floss which has pH values which are compatible to mouth health.

Another object of the present invention is to provide dental floss production processes which do not lead to toxic effect for environment.

The present invention relates to production of a dental floss which has remedial and protective characteristics. Accordingly, said production is characterized by application of the process steps of:

i. Obtaining wood pulp from beech, birch, poplar, elm and oak trees by applying classical chemical pulp processes and adding this wood pulp into aqueous solution including NMMO at a value between 50% and 65% by weight and obtaining spinning solution, ii. Passing the obtained spinning solution through nozzles at suitable temperatures of 100° C. and above and obtaining, collecting, washing and wrapping of fibers, iii. Turning said fibers into floss form.

By means of this, floss is obtained which is bio-compatible and obtained from industrial trees and which can decompose as waste in environment when the usage duration is finished.

In a possible embodiment of the present invention, in step (i), the water which exists in the spinning solution is vaporized at a value between 13% and 20%.

In a possible embodiment of the present invention, the vaporization process of said water is realized at temperatures of 100° C. and above in a compliant manner to the tree kind which is the raw material.

In a possible embodiment of the present invention, in step (iii), said floss is obtained from fibers by means of open-end or ring floss spinning system.

In a possible embodiment of the present invention, the obtained dental floss is used in the form of rolling into a plastic box.

DETAILED DESCRIPTION OF THE EMBODIMENTS

In this detailed description, the subject matter relates to the production of a dental floss and is explained with references to examples without forming any restrictive effect only in order to make the subject more understandable.

Said invention relates to taking celluloses from industrial trees by means of chemical pulp processing method which does not give damage to environment, turning them into fiber form, and turning fibers of industrial trees into dental floss form. As said industrial tree, a tree kind selected from beech tree, birch tree, poplar tree, elm and oak tree is used.

Usage of beech, birch, poplar, elm and oak trees as raw material in the related technical field does not have a high cost. Thanks to this, obtaining of a dental floss which has low costs in the related technical field can be provided. As known, one of the biggest reasons of usage of artificial chemicals in dental flosses is that the raw material costs are low.

Thanks to the production method recommended in the present invention, said trees are turned into dental floss form and the obtained final form is turned into box prototype form which can be put into market.

The production method recommended in the present invention comprises arrangements for providing turning beech, birch, poplar, elm and oak trees, used as raw material, into bio-compatible dental floss form. The obtained beech, birch, poplar, elm and oak tree fibers clean the teeth, provide brilliance and activate salivary glands thanks to their taste and affect mechanical digestion which is the first step of digestion.

The trees used as raw material in the invention are particularly selected. The biggest factor for the selection of said trees is that said trees include chemical active substances like sodium bicarbonate, fluoride ions, silicium, tannic acid and astringent. Thanks to this, the fibers, obtained from said trees, keep the teeth clean, brilliant and healthy, and at the same time, said fibers have protective functions.

Since the pH value of the wood fibers used as raw material in the invention is the same as the pH values of the mouth medium, said fibers are bio-compatible and do not show reaction in the mouth. Thanks to this, the dental floss does not show any reaction in the mouth which is the first step of digestion.

The wood fibers used as raw material in the invention prevent tooth plaques and at the same time, said fibers make massage to the gums and have antibacterial characteristic.

In the invention, wood fibers are used as raw material. Thanks to this, damaging of environment due to the usage of toxic raw materials is eliminated.

The production of dental floss from the woods recommended in the invention is basically provided by applying the process steps of:

i. Preparing homogenous solution of the pulp of industrial trees, ii. Obtaining fiber from the solution by means of spinning method, iii. Turning the fibers into floss form.

The trees described in step (i) are beech, birch, poplar, elm and oak trees.

In step (i), said solution comprises chemical pulp obtained from industrial trees, N-methyl morfolin oxide (it will be called as NMMO) and water. The wood pulp obtained from beech, birch, poplar, elm and oak trees is added to the aqueous solution including NMMO at a value between 50% and 65% by weight. The water in said solution must be vaporized in order to increase the density of NMMO chemical.

The wood pulp, obtained from beech, birch, poplar, elm and oak trees, is dissolving after the water amount decreases by a value between 13% and 20% by weight. The vaporization process of said water is realized at temperatures of 100° C. and acceptably above for specific durations. The step (i) is applied for duration between 60 and 250 minutes in a compliant manner also to different tree kinds.

The process (i) applied in the invention is needed for separation/obtaining of fibers from wood pulp called as delignification and it is named also as cooking in some sources.

The vaporization process for the solution where beech tree exists as the raw material for obtaining the fiber in the invention is realized at temperatures between 150 and 180° C. and for duration between 100 and 150 minutes.

The vaporization process for the solution where birch tree exists as the raw material for obtaining the fiber in the invention is realized at temperatures between 200 and 250° C. and for duration between 80 and 100 minutes.

The vaporization process for the solution where poplar tree exists as the raw material for obtaining the fiber in the invention is realized at temperatures between 150 and 200° C. and for duration between 120 and 170 minutes.

The vaporization process for the solution where elm tree exists as the raw material for obtaining the fiber in the invention is realized at temperatures between 150 and 200° C. and for duration between 75 and 100 minutes.

In step (ii), said spinning process is realized in the spinning baths, and NMMO chemical compound is regenerated in the air gap while it is applied to the baths. After realization of the processes in the spinning pool, the fibers are collected, washed and finally wrapped.

After application of step (ii), NMMO chemical compound is recovered from spinning baths of fibers of beech, birch, poplar, elm and oak trees thanks to the coagulant. Afterwards, the obtained NMMO chemical compound is filtered and is included to the production process for being used again. Thanks to this, it can be used again as the raw material and is not given to environment as waste.

The fibers, obtained in the spinning pool in step (ii), are turned into floss form by means of the open-end or ring floss spinning system in step (iii).

The fiber obtained after step (iii) is placed into a plastic box in a rolled form and is presented to the consumer for tooth cleaning.

The consumer once tears the dental floss which is in disposable form, and uses it and can throw it to environment. The dental floss thrown away shall decompose within 3 or 6 months.

The protection scope of the present invention is set forth in the annexed claims and cannot be restricted to the illustrative disclosures given above, under the detailed description. It is because a person skilled in the relevant art can obviously produce similar embodiments under the light of the foregoing disclosures, without departing from the main principles of the present invention.

What is claimed is:

1. A production method of a dental floss, wherein the dental floss has antibacterial, remedial and protective characteristics, the dental floss is obtained from industrial trees, and the dental floss is bio-compatible and allowed to be decomposed as waste in environment when a usage duration is finished, wherein the production method comprises:

step (i): obtaining wood pulp from beech, birch, poplar, elm and oak trees by applying classical chemical pulp processes and adding the wood pulp into aqueous solution including NMMO at a value between 50% and 65% by weight and obtaining a spinning solution;

step (ii): passing the spinning solution through nozzles at suitable temperatures of 100° C. and above and obtaining, collecting, washing and wrapping fibers; and step (iii): turning the fibers into the dental floss, wherein the obtained fibers and the dental floss comprise chemical active substances including at least one of: sodium bicarbonate, fluoride ions, silicium, tannic acid and astringent from the trees to provide the antibacterial, remedial and protective characteristics, and wherein a pH of the obtained fibers is the same as a pH of a mouth medium.

2. The production method of the dental floss according to claim 1, wherein in step (i), water in the spinning solution is vaporized at a value between 13% and 20%.

3. The production method of the dental floss according to claim 2, wherein a vaporization process of the water is realized at temperatures of 100° C. and above in a compliant manner to a tree kind, wherein the tree kind is a raw material.

4. The production method of the dental floss according to claim 1, wherein in step (iii), obtaining the dental floss from the fibers is realized by an open-end or ring floss spinning system.

* * * * *